(12) United States Patent
Minkoff

(10) Patent No.: US 7,420,509 B2
(45) Date of Patent: Sep. 2, 2008

(54) METHODS AND APPARATUS FOR ADAPTIVELY PERFORMING ALGEBRAIC INTERFERENCE CANCELLATION

(75) Inventor: John Minkoff, Englewood, NJ (US)

(73) Assignee: ITT Manufacturing Enterprises, Inc., WIlmington, DE (US)

( * ) Notice: Subject to any disclaimer, the term of this patent is extended or adjusted under 35 U.S.C. 154(b) by 107 days.

(21) Appl. No.: 11/202,182

(22) Filed: Aug. 12, 2005

(65) Prior Publication Data

US 2008/0007454 A1 Jan. 10, 2008

(51) Int. Cl.
  *G01S 3/28* (2006.01)
  *G01S 1/00* (2006.01)
  *H01Q 3/22* (2006.01)
(52) U.S. Cl. .................. 342/379; 342/375; 342/357.12
(58) Field of Classification Search .................. 342/375
  See application file for complete search history.

(56) References Cited

U.S. PATENT DOCUMENTS

| | | | | |
|---|---|---|---|---|
| 5,572,219 | A * | 11/1996 | Silverstein et al. | 342/375 |
| 5,771,439 | A * | 6/1998 | Kennedy et al. | 455/63.1 |
| 5,926,135 | A | 7/1999 | Minkoff | |
| 6,108,564 | A | 8/2000 | Minkoff | |
| 6,111,816 | A * | 8/2000 | Chiang et al. | 367/7 |
| 6,188,352 | B1 * | 2/2001 | Choi et al. | 342/378 |
| 6,784,831 | B1 * | 8/2004 | Wang et al. | 342/357.12 |
| 6,856,945 | B2 * | 2/2005 | Thomas et al. | 702/189 |
| 6,975,666 | B2 * | 12/2005 | Affes et al. | 375/130 |
| 7,099,698 | B2 * | 8/2006 | Tarokh et al. | 455/562.1 |
| 2006/0220956 | A1 * | 10/2006 | Richardson et al. | 342/375 |

OTHER PUBLICATIONS

U.S. Appl. No. 10/850,443, Minkoff.
U.S. Appl. No. 10/762,249, Minkoff.

\* cited by examiner

*Primary Examiner*—Thomas H. Tarcza
*Assistant Examiner*—Harry Liu
(74) *Attorney, Agent, or Firm*—Edell, Shapiro & Finnan, LLC

(57) ABSTRACT

An adaptive algebraic interference cancellation technique for canceling interference from a signal of interest received by an array of antenna elements involves: generating a set of antenna element signals that reflect reception of the signal of interest and interference at the respective antenna elements; adaptively determining the direction of one or more interference sources received with the signal of interest; for each interference source, constructing a directional interference vector corresponding to the direction of the interference source; computing a projection operator that transforms each directional interference vector to a zero vector; applying the projection operator to the antenna element signals to remove interference from the antenna element signals; and restoring the signal of interest by individually compensating the antenna element signals for distortion to the signal of interest cause by applying the projection operator.

12 Claims, 8 Drawing Sheets

METHODS AND APPARATUS FOR ADAPTIVELY PERFORMING ALGEBRAIC INTERFERENCE CANCELLATION

BACKGROUND OF THE INVENTION

1. Field of the Invention

The present invention relates to methods and apparatus for adaptively performing algebraic interference cancellation and, more particularly, to techniques for adaptively determining the angular location of interference signals and selectively rejecting the interference signals without distorting a received signal of interest.

2. Description of the Related Art

Phased array antennas consist of an array of individual antenna elements arranged in a particular manner to cooperatively transmit and receive directed beams of electromagnetic energy. An array antenna beam pattern, which typically includes a main lobe and side lobes, defines the angular dependence of the array gain. The shape and direction of an array antenna beam pattern are determined by the relative phases and amplitudes applied at the individual antenna elements that constitute the array via a process referred to as beamforming. By adjusting the relative phases of the antenna elements, the main lobe of the antenna beam pattern can be steered over a range of different directions to transmit a signal in a selected direction or to receive a signal arriving from a particular direction. When receiving a signal, received power is maximized by pointing the main lobe of the array antenna beam pattern in the direction of a source of a signal of interest.

Ideally, the signal of interest is aligned with the boresight of the antenna beam pattern to maximize the received signal strength. Nevertheless, interference signals in the sidelobes or main lobe of the antenna beam pattern may also be received along with the signal of interest. Adaptive interference cancellation schemes for phased array antennas have been in use since the 1960s (see, for example, S. Applebaum, "Adaptive Arrays," Syracuse University Research Corp. Report, SPL TR 66-1, August 1966, and B. Widrow at al., "Adaptive Antenna Systems," Proc. IEEE, Vol. 55, December 1967). Many variations of such schemes exist, but all of them involve the following process. At each sampling instant, a beamforming operation is performed on the set of array outputs. The array outputs present a vector of complex numbers representing a signal of interest and possibly interference from one or more interfering sources, e.g., jammers. The weights used in the beamforming operation, which are calculated in an adaptive process, yield a beam pattern that is deliberately distorted in a manner such that nulls are imposed on the pattern at the angles corresponding to the directions of the interfering sources. As discussed in Hudson, "Principles of Adaptive Arrays," pp. 39-48, Peter Peregrinus, London, 1981, operating with the weights yielded by an optimized adaptive process is equivalent to a beamforming operation in which the beam-steering vectors have been projected into a space orthogonal to the interference directions. The orthogonality is manifested by the nulls in the beam pattern.

The adaptive beamforming/nulling (ABF) operation can be thought of as a process in which a beampattern representing signal plus interference is formed, from which a beampattern representing interference alone is subtracted, as suggested by Hudson and by Monzingo in "Introduction to Adaptive Arrays," Wiley-Interscience, New York, 1980. As such, when the angular separation between signal and interference becomes less than the width of the main lobe, the interference and signal beams begin to overlap, and rejection of interference cannot take place without also attenuating and distorting the signal of interest, which becomes more severe and pronounced as the signal/interference angular separation decreases. Thus, interference in the main lobe of the antenna beam presents a severe problem for ABF systems, and the interference rejection resolution capability is limited by the resolution of the antenna array. Also, since ABF schemes achieve interference rejection by distortion of the array beampatterns, distortions in the output time function representing the signal is unavoidable. Furthermore, since the beamforming process employed is irreversible, it is not possible to correct for the signal distortion. Consequently, it would be desirable to provide improved interference rejection, particularly for interference sources located in the main beam, without distorting the signal of interest.

SUMMARY OF THE INVENTION

According to an exemplary embodiment of the invention, an adaptive algebraic interference cancellation (AAIC) technique for canceling interference from a signal of interest received by an array of antenna elements includes: generating a set of antenna element signals that reflect reception of the signal of interest and interference at the respective antenna elements; adaptively determining the direction of one or more interference sources received with the signal of interest; for each interference source, constructing a directional interference vector corresponding to the direction of the interference source; computing a projection operator that transforms each directional interference vector to a zero vector; applying the projection operator to the antenna element signals to remove interference from the antenna element signals; and restoring the signal of interest by individually compensating the antenna element signals for distortion to the signal of interest cause by applying the projection operator.

The projection operator can be an M×M matrix A of rank M−k, where M is the number of antenna elements in the antenna array, k is the number of interference sources to be rejected, and k<M. The matrix A is computed to satisfy the expression $Ai_n=0$, for n=1 to k, where $i_n$ are the directional interference vectors. Application of the projection operator eliminates the interference signal but also distorts the signal of interest. However, the signal of interest can be restored exactly by dividing each transformed antenna element signal by a corresponding factor that can be determined from the computations required to generate the projection operator.

The adaptive process for determining the directions of interference sources can be essentially the same type of adaptive process used in conventional adaptive beamforming schemes, in which weights are derived from the received signal. However, unlike adaptive beamforming schemes, these weights are not used in a beamforming operation in the AAIC technique of the present invention. Instead, the weights are used in an algebraic operation to eliminate interference arriving from the directions specified by the weights without distorting the signal of interest. The invention essentially employs the capability of adaptive beamforming techniques to determine the angles of interference sources, but rather than performing a beamforming operation, uses this information in a superior interference rejection scheme.

The adaptive algebraic interference cancellation (AAIC) process is performed by a purely deterministic algebraic operation applied directly to the antenna element signals, which constitute at each sampling instant a vector of complex numbers, to selectively reject interference at each array element. Beamforming is not performed in the AAIC process, and no array characteristics such as resolution and beampatterns come into play. Consequently, an undistorted signal of interest can be recovered. Further, because AAIC operates independently of array beampatterns and resolution, there is no fundamental limit on minimum (but not zero) angular separation between an interfering source and a signal of interest that can be observed undistorted by ether interference or the process of rejecting.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
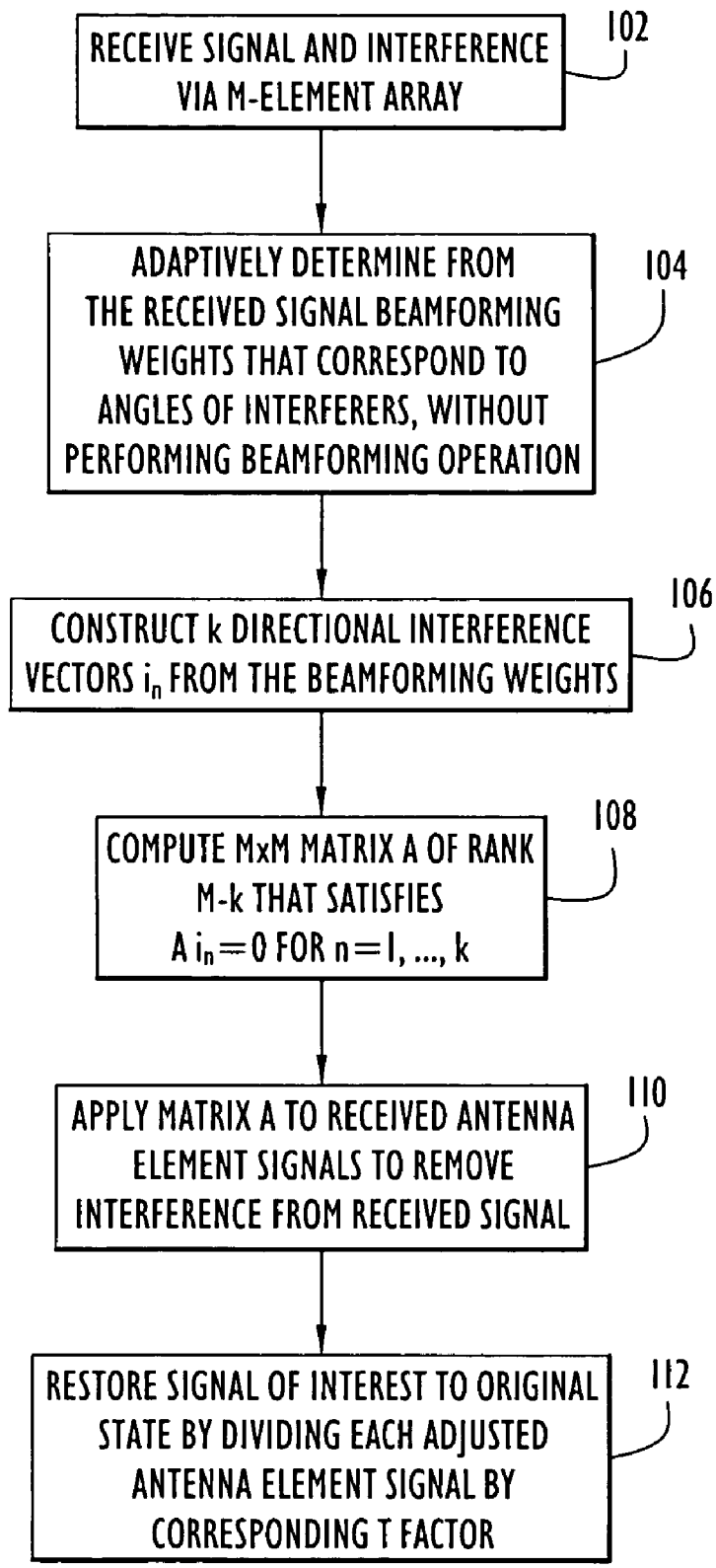
FIG. 1 is a functional flow diagram of an adaptive technique for algebraically canceling interference in accordance with an exemplary embodiment of the present invention.

As previously noted, conventional techniques based upon beamforming are limited in their ability to reject interference from sources closely spaced in angle to a signal source of interest. Upon subtracting from the signal beam a beam formed on the interference source, a null is produced in the signal beam pattern; however, the nulling is not selective and affects reception of a signal of interest as well as the interference. As signal and interference become closer together in angle, the signal will increasingly also become rejected by the process along with the interference. This sets a limit on the minimum signal/interference separation that can be effectively dealt with in rejecting interference by means of beamforming techniques. The limitation is due primarily to the array beam pattern beamwidth, which is determined by physical characteristics of the array antenna. Hence, using conventional array beamforming techniques, the ability to reject interference signals in close proximity to a signal of interest is significantly limited by the physical characteristics of the array antenna.

Nevertheless, an advantageous feature of typical adaptive beamforming techniques is that they essentially determine the angles at which interference is present. More specifically, an adaptive process generates weights that are used in a beamforming operation to distort the beam pattern by imposing nulls at the angles corresponding to the directions of the interfering sources. In adaptive beamforming, the manner of operation with the weights is equivalent to operating with a set of beamsteering vectors that have been projected into the null space of a matrix that is orthogonal to the interference directions. In other words, the angles corresponding to the interference directions can be directly determined from the weights generated by an optimized, adaptive beamforming process.

According to the invention, an adaptive process, such as that used in typical adaptive beamforming operations, is used to generate information (e.g., the aforementioned weights) that specifies the angles corresponding to the directions of interfering sources. However, unlike adaptive beamforming, these weights are not used in a beamforming operation. Rather, the weights are used in an algebraic operation to eliminate interference arriving from the angles specified by the weights without distorting the signal of interest. In effect, the invention employs the capability of adaptive beamforming techniques to determine the angles of interference sources, but instead of performing a beamforming operation, uses this information in a superior interference rejection scheme.

More specifically, an adaptive algebraic interference cancellation (AAIC) technique can be employed to reject interference. This technique differs fundamentally from adaptive beamforming (ABF) schemes in a number of respects. First, the interference rejection of the AAIC technique is accomplished by a purely deterministic algebraic operation applied directly to the array outputs, which constitute at each sampling instant a vector of complex numbers. Beamforming plays no role in the process, and no array characteristics such as resolution and beampatterns come into play. Second, with AAIC, interference is rejected selectively at each array element. As a result, rather than yielding a single distorted output representing the signal of interest, as in the case of ABF, with AAIC, array beampatterns after interference rejection and signal restoration are identical to what they would be if the interference were non-existent. Further, because AAIC operates independently of array beampatterns and resolution, there is no fundamental limit on minimum (but not zero) angular separation between an interfering source and a signal of interest that can be observed undistorted by ether interference or the process of rejecting. The practical limit on this capability is determined by receiver noise, as discussed below.

As used herein, the terms antenna beam(s), or simply "beam(s)", refer generally to transmitted energy concentrated in a certain direction or a sensitivity or receptiveness of the antenna to signals arriving from particular directions. The antenna beam is formed by a directional antenna and is directed over a particular angular region in accordance with the antenna pattern (i.e., the radiated field intensity as a function of angle), resulting in a directed signal. The antenna beam may be fixed in a particular direction or may be electronically or mechanically steered over a range of directions. Typically, it is possible to electronically steer the antenna beam by controlling the relative phases of the signals transmitted by the individual antenna elements in the antenna array.

A functional flow diagram is shown in FIG. 1, illustrating the operations performed in adaptive algebraic interference cancellation (AAIC) in accordance with an exemplary embodiment of the present invention. In operation 102, each of M antenna elements which collectively constitute a phased array antenna receives a respective radiation signal (e.g., an RF signal). The radiation signals may include a signal of interest arriving at an angle substantially centered along the boresight of the main lobe of the receive antenna pattern along with interference signals arriving at various angles, which may be in the main lobe or in the sidelobes of the antenna beam. Each antenna element in the array separately receives a signal with a particular amplitude and phase; thus, the received radiation signal is actually a set of M signals received by the individual antenna elements.

Next, operation 104 involves adaptively determining information (e.g., weights) from the received signal, wherein the information indicates the angles corresponding to the direction of interference signals. AAIC uses essentially the same adaptive process as adaptive beamforming/nulling (ABF) techniques. For example, a known adaptive least-mean-square (LMS) algorithm can be used to converge to optimal weights. However, an important difference between AAIC and ABF resides in the use of the weights that are generated in the process. As previously noted, in ABF, the manner of operation with the weights is equivalent to operating with a set of beamsteering vectors that have been projected into the null space of a matrix. With AAIC, the projection operator defined by the weights is applied not to beamsteering vectors but to the observables, namely, the array outputs which, at each sampling instant, present a vector of complex numbers. Application of the projection operator in AAIC transforms the interference vectors into the zero vector. The interference vectors are annihilated by transformation into the null space of the projection operator. With an array of M elements, M−1 interfering sources can be annihilated by a single projection operation, specifically, a matrix multiplication.

Accordingly, in operation 106, for an M-element array, an M×1 column vector i that corresponds to the direction of an interference source can be constructed from the information provided by the beamforming weights:

$$i = \begin{bmatrix} e^{i\theta_{M-1/2}} \\ e^{i\theta_{M-2/2}} \\ \vdots \\ e^{-i\theta_{M-1/2}} \end{bmatrix} \quad (1)$$

where the phases $\theta_n$ are of the form $\theta_n = 2\pi f n \tau$ where $\tau$ is the inter-element delay for the incident interference wave-front. This information is given directly by the weights determined from the adaptive process, since the Fourier transform of the weight vector has nulls for those angles corresponding to interference directions. Thus, the adaptive process, in converging to the optimum weights, provides the necessary information for generating the AAIC projection operator.

The next operation (108) in the AAIC process involves constructing a matrix A such that for an interference vector i, the matrix multiplication of matrix A and vector i is zero:

$$Ai = 0 \quad (2)$$

The matrix A is essentially a mathematical tool that can be used to eliminate as many as M−1 potential sources of interference received by an array antenna with M array elements. In general, in order for equation (2) to be satisfied by a non-trivial solution, i≠0, it is necessary that A be rank deficient; that is, it cannot have an inverse (if the M×M matrix A is full rank, there is only the trivial solution i=0). If there are k<M interferers, a rank-deficient matrix A, of rank M−k, is sought, satisfying the expression:

$$Ai_n = 0, \text{ for } n = 1, 2, \ldots, k \quad (3)$$

where the vectors $i_n$ are the M×1 directional interference vectors of the form of equation (1), which populate the k-dimensional null-space of A.

Matrix A is constructed by making use of a theorem from matrix algebra which states that if an M×M Hermitian matrix K has a k-fold repeated eigenvalue $\lambda$, the matrix $\lambda I - K$ has rank M−k, where I is the M×M identity matrix. Consider the M×M matrix K written in dyadic form as $$K = \sum_{m=1}^{k} v_m v_m^H \quad (4)$$

expressed as a sum of vector outer products, where H denotes the Hermitian conjugate and the $v_m$ are a set of M-element orthonormal column vectors. The matrix K is Hermitian and has a k-fold repeated eigenvalue equal to unity (the remaining roots are all zero). Therefore, the matrix A is given by:

$$A = I - K \quad (5)$$

With k interference vectors, I−K has a k-dimensional null space. That is, there are k non-zero interference vectors $i_n$ n=1,2, . . . k such that:

$$Ai_n = (I-K)i_n = 0 \quad (6)$$

The vectors $v_m$ are determined by solving the set of equations:

$$AI_n = \left(I - \sum_{m=1}^{k} v_m v_m^H\right) i_n = 0 \quad n = 1, 2, \ldots, k \quad (7)$$

or equivalently $$\sum_{m=1}^{k} (v_m, i_n) v_n = i_n \quad n = 1, 2, \ldots, k \quad (8)$$

As previously noted, knowledge of the interference angular locations completely specifies the k directional interference vectors $i_n$ in equations (7) and (8). Once the vectors $v_m$ are determined, the matrix A is computed from equations (4) and (5).

Thus, in seeking the matrix A, one arrives at a Gram-Schmidt orthogonalization procedure. This illustrates another major difference between the described AAIC technique and beam-forming/nulling schemes. Here, Gram-Schmidt is applied in order to produce an orthonormal coordinate system as a basis set for representation of the set of selected directional vectors. In the beamforming/nulling schemes, Gram-Schmidt is used to orthogonalize the beamsteering vectors with respect to the interference vectors. In the present invention, the AAIC operators generated by the Gram-Schmidt procedure are applied to different objects for entirely different purposes.

Once the matrix A has been computed, it can be applied to the outputs of the antenna elements to remove interference arriving from the k directions of the interference signals (operation 110 in FIG. 1). Specifically, the signal of interest s arriving at the M elements of the array can be represented by the M×1 column vector:

$$s = \begin{bmatrix} e^{i\phi_{M-1/2}} \\ e^{i\phi_{M-2/2}} \\ \vdots \\ e^{-i\phi_{M-1/2}} \end{bmatrix} \quad (9)$$

where the phases $\phi_n$ are of the form $\phi_n = 2\pi f n \tau$ where $\tau$ is the inter-element delay for the incident wave-front of the signal of interest. Where k interference signals $i_n$ arrive along with the signal of interest s, the received signal plus interference (i.e., the outputs of the M antenna elements) is given by the vector sum:

$$s + \sum_{n=1}^{k} i_n = s + i_1 + i_2 + \ldots + i_k = s + i_n, n = 1, 2, \ldots, k \quad (10)$$

Since the matrix A eliminates each of the k interference signals, it holds that:

$$A\left(s + \sum_{n=1}^{k} i_n\right) = As = s' \quad (11)$$

In other words, multiplying the M×M matrix A by an M×1 vector of the outputs of the M antenna elements yields an M×1 vector of modified antenna element outputs s' in which the interference signals have been eliminated. This projection operation performed by matrix A, which annihilates the interference, also imposes a transformation on the signal which must be removed. Since matrix A is singular by construction this cannot be accomplished by a matrix inversion.

However, the transformed signal at the $m^{th}$ element of the array can be written as:

$$s'_m = A s_m \quad (12)$$

$$= (I - K) s_m$$

$$= e^{i2\pi f(t - \tau_m)} - \sum_{n=0}^{M-1} K_{m,n} e^{i2\pi f(t - \tau_n)}$$

$$= e^{i2\pi f(t - \tau_m)} \left[1 - \sum_{n=0}^{M-1} K_{m,n} e^{i2\pi f(\tau_m - \tau_n)}\right]$$

where the $K_{m,n}$ are the elements of the matrix K, and $\tau_m$ are the inter-element delays for the look angle of interest (i.e., the signal of interest) Thus, while the projection operation performed by matrix A eliminates the interference signals, the transformation this process imposes on the signal of interest amounts to multiplying the signal at the $m^{th}$ element ($s_m$) by the complex number T(m) given by:

$$T(m) = 1 - \sum_{n=0}^{M-1} K_{m,n} e^{i2\pi f(\tau_m - \tau_n)} \quad (13)$$

Thus, after the transformation caused by matrix A, the modified signal $s'_m$ at the $m^{th}$ element is equal to $T(m) * s_m$, where $s_m$ is the original signal of interest received at the $m^{th}$ element.

Consequently, to restore the signal of interest to its original state after interference rejection, the modified output of each element $s'_m$ is divided by the corresponding T factor (T(m)) to yield the original signal of interest $s_m$ without interference (operation 112 in FIG. 1). Note that K and hence T(m) is always an exactly known quantity. Hence, for any value of $\tau$, the signal can always be restored exactly, independently of any errors in the adaptively determined interference locations. However, since the magnitudes of the T factors are always less than unity, any noise in the system will be amplified. Since the magnitudes of the T factors become progressively smaller as signal and interference become closer in angular proximity, noise imposes a practical limit on the minimum angular separation between signal and interference sources that can be satisfactorily eliminated.

A very simple example based on a two-element array is now described to help illustrate the AAIC process. Assume a single signal of interest and a single interference signal are received from two respective directions. The signal and interference may be represented at the two-element array by the vector equations (14) and (15) below:

$$s = \begin{bmatrix} 1 \\ e^{i\theta} \end{bmatrix} \quad (14)$$

$$i = \begin{bmatrix} 1 \\ e^{i\phi} \end{bmatrix} \quad (15)$$

where the signal and interference directions are represented, respectively, by the angles $\theta$ and $\phi$ and each is of the form $2\pi f \tau$, respectively, and where $\tau$ represents the propagation delay between the first and second array elements in these examples ($\tau_\theta$ is the delay for the signal wave front and $\tau_\phi$ is delay for the interference wave front).

A rank-deficient matrix A is constructed, of rank unity in this example, whose null-space contains the vector i as given by the equation:

$$A = \frac{1}{2} \begin{bmatrix} 1 & -e^{-i\phi} \\ -e^{i\phi} & 1 \end{bmatrix} \quad (16)$$

and multiplication of s+i by A yields:

$$A(s+i) = \frac{1}{2} \begin{bmatrix} 1 & -e^{-i\phi} \\ -e^{i\phi} & 1 \end{bmatrix} \left[ \begin{bmatrix} 1 \\ e^{i\theta} \end{bmatrix} + \begin{bmatrix} 1 \\ e^{i\phi} \end{bmatrix} \right] \quad (17)$$

$$= \begin{bmatrix} 1T \\ e^{i\theta} T^* \end{bmatrix} + \begin{bmatrix} 0 \\ 0 \end{bmatrix}$$

$$= \begin{bmatrix} s'_1 \\ s'_2 \end{bmatrix}$$

where $T = \dfrac{1 - e^{i(\theta - \phi)}}{2}$

Thus the interference i is eliminated, and by dividing $s_1'$ by T and $s_2'$ by T*, the transformation by A on the signal is reversed, yielding the desired signal vector:

$$s = \begin{bmatrix} s'_1 / T \\ s'_2 / T^* \end{bmatrix} \quad (18)$$

Using the AAIC approach, sources of interference are eliminated selectively at each array element by the transformation of the directional interference vectors into the zero vector. Conventional beam-forming process play no part. After interference rejection with AAIC, beamforming, if performed, yields an undistorted signal, as if the interference had not existed. The signals of interest can be exactly recovered. Note, however, that in eliminating the effect of the transformation by A on s by removing the complex multiplicative factors, $$T = \left[\frac{1-e^{i(\theta-\phi)}}{2}\right] \text{ and } T^* = \left[\frac{1-e^{-i(\theta-\phi)}}{2}\right] \quad (19)$$

the denominators in equation (18) become progressively smaller in magnitude as signal and interference become closer together in angle. As previously noted, this will amplify any noise or other interference that may be present. Thus, the minimum tolerable, but nonzero, angular separation between a signal of interest and a potential interfering source that one wishes to reject is a function of the receiver noise characteristics. There is no limitation other than signal-to-noise ratio considerations on the minimum angular separation.

A significant difference between conventional approaches based upon beamforming techniques and the AAIC approach described here is the objects to which a transformation is applied. In conventional approaches, a transformation operation is applied to the beamsteering vectors for projection into a subspace orthogonal to the interference. The transformed vectors are then applied to the signal plus interference in a conventional beam-forming operation to produce a null in the direction of the interference, by which the interference is reduced, and signals of interest close in angle to the interference, i.e., nominally within a beamwidth, will be equally affected by the null. With the AAIC approach of the present invention, the transformation is applied directly to the array output s+i, which selectively removes the components of interference directly from each array element leaving only the transformed but recoverable signal vector s, with no physical array issues such as limitations imposed by angle resolution and array beamwidth, or beam-steering vectors, coming into play.

Figure 2:
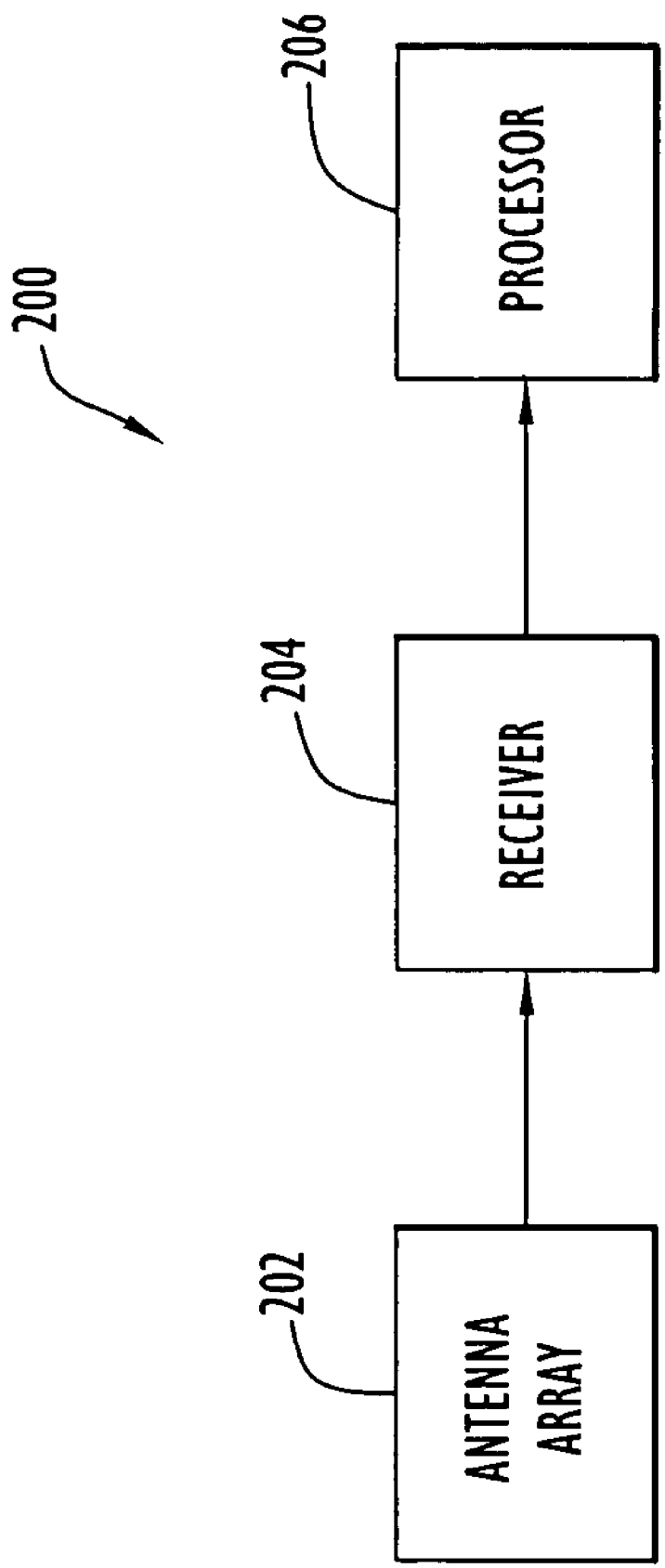
FIG. 2 is a block diagram of a signal processing device configured to receive a signal via a phased array antenna and to perform adaptive algebraic interference cancellation in accordance with an exemplary embodiment of the present invention.

FIG. 2 is a block diagram that conceptually illustrates the functional modules in a system 200 for applying the described AAIC technique, as described above, to a signal received along with interference at an array antenna. FIG. 2 is a conceptual diagram illustrating major functional units and overall architecture, and does not necessarily illustrate physical relationships. Signals from one or more sources (e.g., a signal of interest and interference signals) are received by array antenna 202, where signals received by individual array elements may be phase shifted and amplitude adjusted in accordance with an array antenna beam pattern. Output from each of the respective array elements is passed to receiver 204 which collects and organizes the signal information for presentation to and processing by processor 206. Processor 206 receives and processes the array outputs in accordance with the AAIC scheme described above. Depending upon the nature of the array antenna, phase and amplitude adjustments may be performed by receiver 204 rather than by each of the respective antenna elements of array antenna 202.

Processor 206 may be implemented in single processor or a number of different processor that perform different functions. For example, processor 206 may be implemented by any combination of hardware and software that may be statically and/or dynamically configured to perform AAIC as described above.

In comparing performance of AAIC with that of conventional adaptive beamforming/nulling schemes, there are two principle issues of interest: signal distortion and signal attenuation. For both of these issues, there are two angular regions of interest, namely, the sidelobe and the main lobe regions. It is generally accepted that ABF schemes give satisfactory performance for rejecting interference in the sidelobes, and equally well acknowledged that ABF schemes have serious problems in dealing with interference in the main lobe. Both of these issues are addressed by the following performance analysis for both angular ranges, revealing the markedly superior performance of AAIC over ABF for main-lobe interference.

Figure 3:
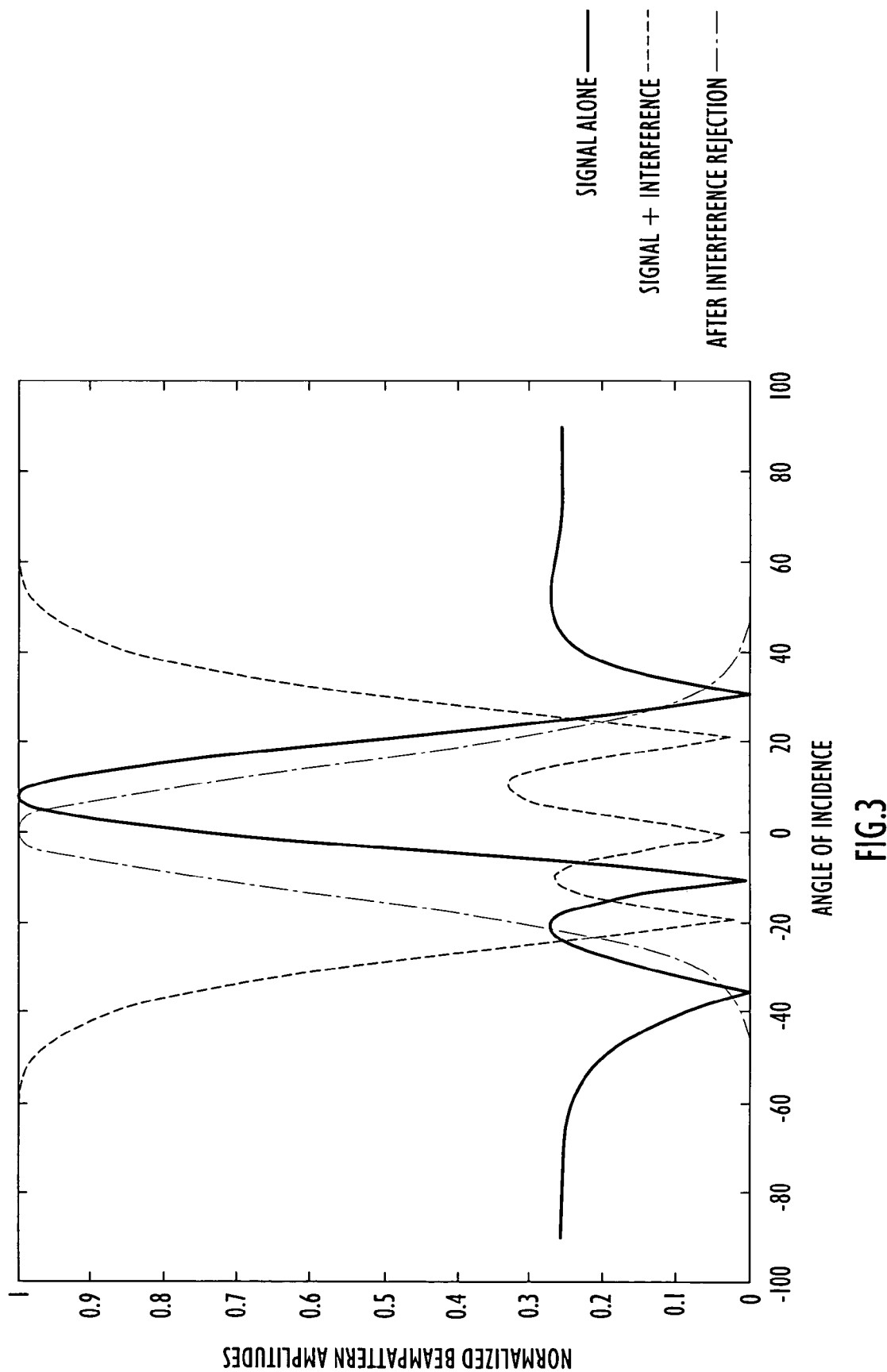
FIG. 3 is a graphical plot of a signal with sidelobe interference and of the interference rejection resulting from performing a conventional adaptive beamforming/nulling operation.

To compare the extent to which the ABF and AAIC processes impose distortion on the signal of interest, a four-element array is considered with half-wavelength spacing between elements, and the beampatterns that result after interference rejection by the two methods are compared. As noted above, beamforming plays no part in rejecting interference by AAIC. FIG. 3 presents a plot of the beam pattern for signal alone, at 12° and a plot of the normalized beampattern for signal plus three interferers at ±85° and −80°. ABF was applied by a beamforming operation in which the beamforming vectors were projected into a space orthogonal to the interference. As explained in the above-mentioned text by Hudson, this yields optimum performance for ABF systems. As can be seen from the plot of the resulting beampattern is shown in FIG. 3, the interference has been eliminated, but the pattern differs markedly from that for signal alone, and, in fact, gives an erroneous indication of the location of the signal, which is evidence of distortion introduced into the signal by the ABF process.

Figure 4:
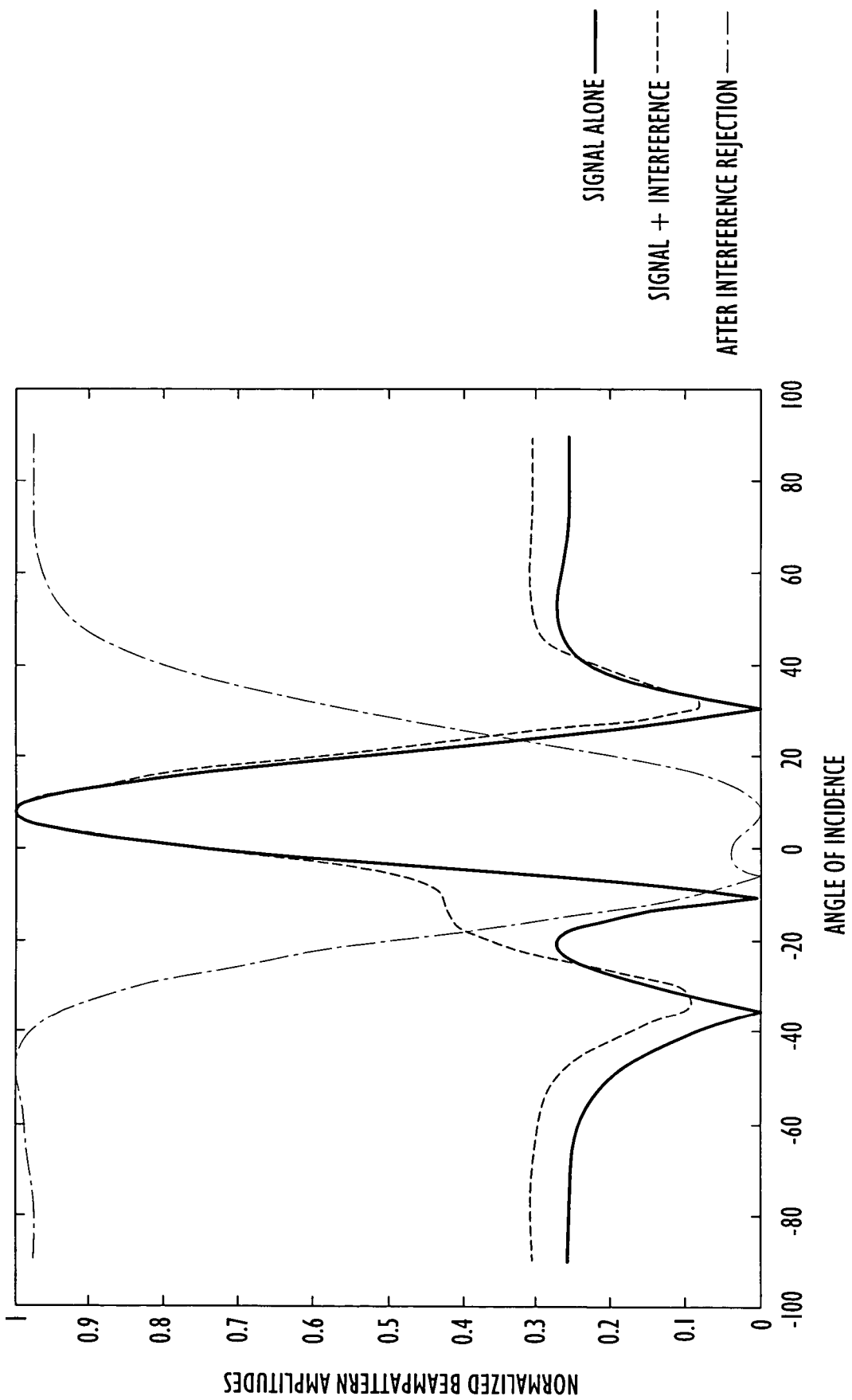
FIG. 4 is a graphical plot of a signal with interference in the main lobe of the antenna beam and of the interference rejection resulting from performing a conventional adaptive beamforming/nulling operation.

In the example shown in FIG. 3, the interference was in the sidelobes, well away from the main lobe. FIG. 4 presents results of an ABF processes in a case of three interferers, where two of the interferers are located at 11° and 13°, 1° away on either side of the signal, and the third at −10°, all three therefore being within the main lobe. As seen in FIG. 4, the beampattern after application of ABF is extremely distorted, to the extent of being not useable.

Figure 5:
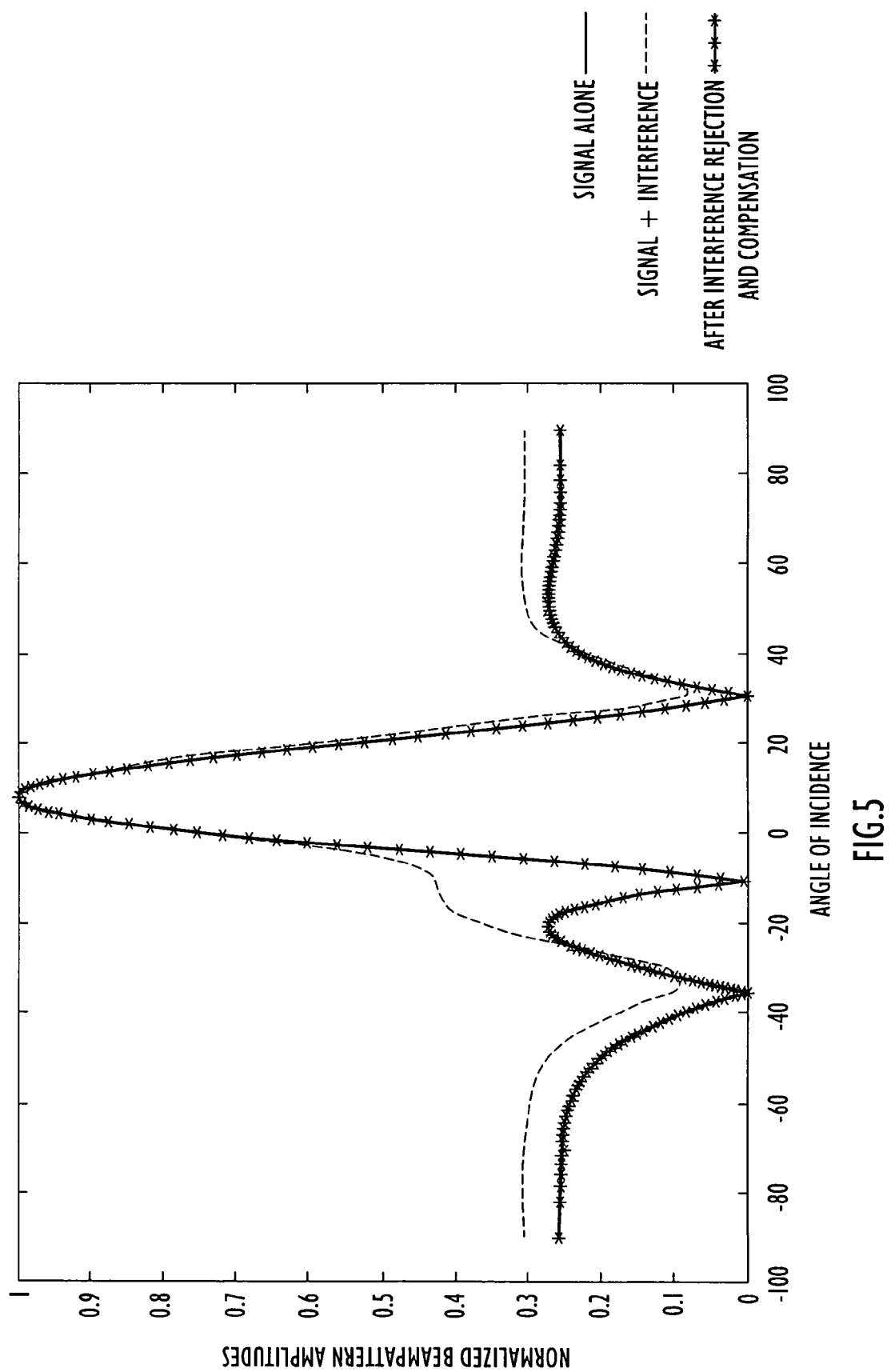
FIG. 5 is a graphical plot of a signal with interference in the main lobe of the antenna beam and of the interference rejection resulting from performing adaptive algebraic interference cancellation in accordance with an exemplary embodiment of the present invention.

FIG. 5 presents the results for this same interference situation shown in FIG. 4, but using AAIC to reject interference instead of a conventional ABF processes. The plot for signal plus interference is therefore identical to that in FIG. 4, but the pattern after interference rejection and signal recovery by the AAIC technique described above is identical to that of the signal alone. This is evidence of no distortion imposed on the signal, which of course is markedly dissimilar from ABF. As noted above, this result is made possible by AAIC process yielding separate signal outputs for each array element, which allows removal of the effect of the transformation on the signal by the projection operation.

Figure 6:
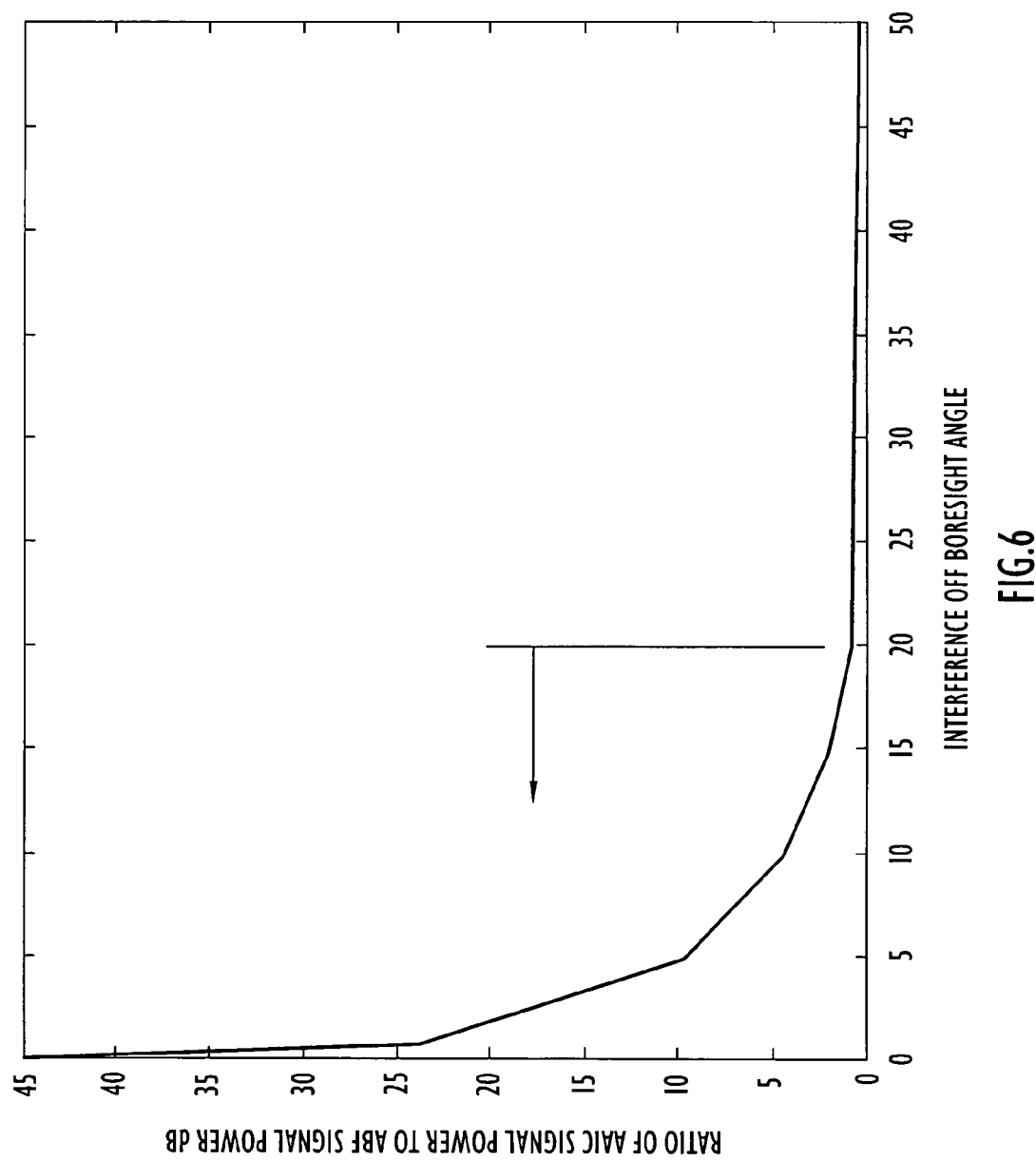
FIG. 6 is a graphical plot of the ratio of the signal power resulting from adaptive algebraic interference cancellation to the signal power resulting from adaptive beamforming/nulling as a function of the angle off the signal boresight of the rejected interference.
Figure 7:
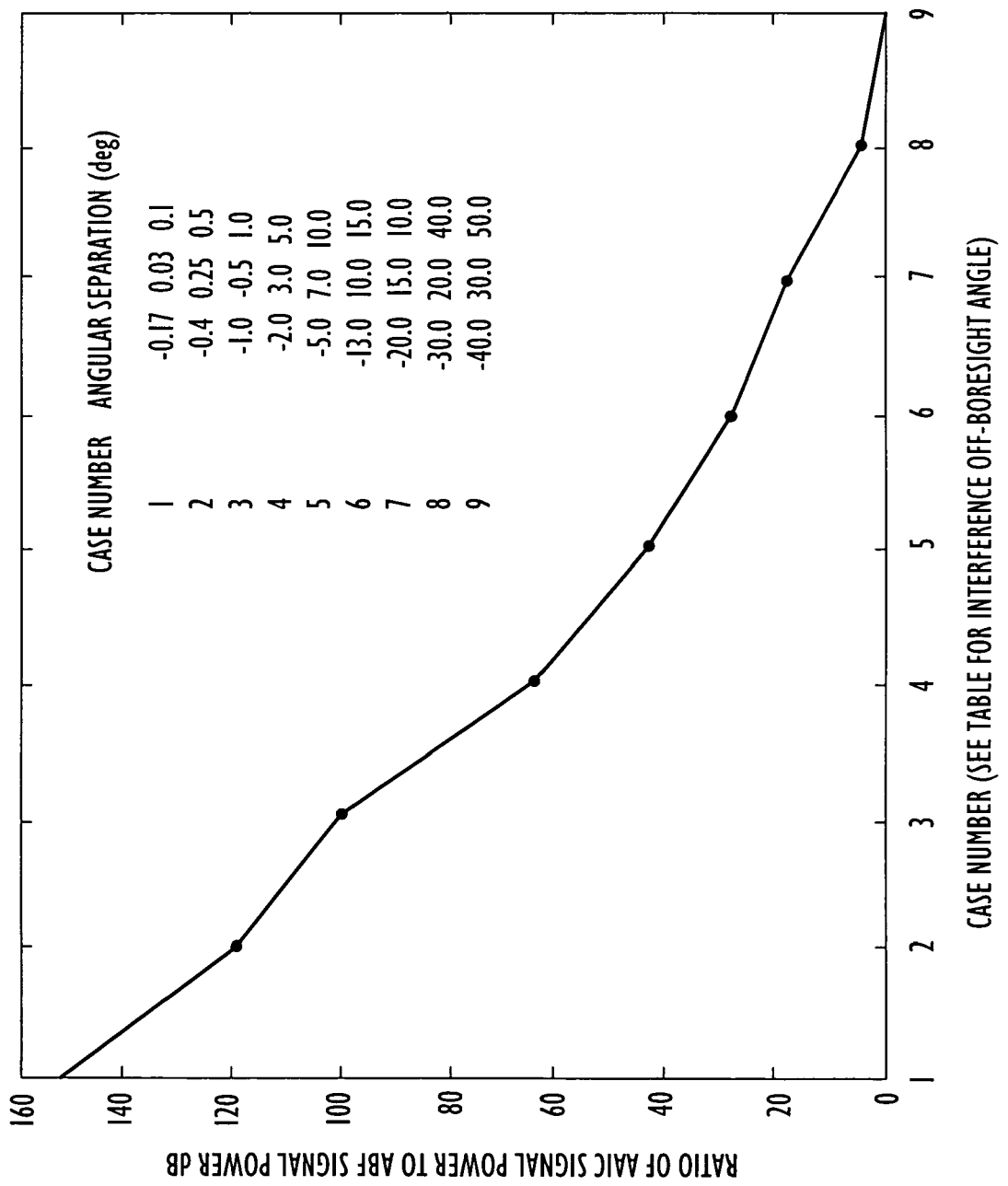
FIG. 7 is a graphical plot of the ratio of the signal power resulting from adaptive algebraic interference cancellation to the signal power resulting from adaptive beamforming/nulling for selected cases of multiple interference signals.
Figure 8:
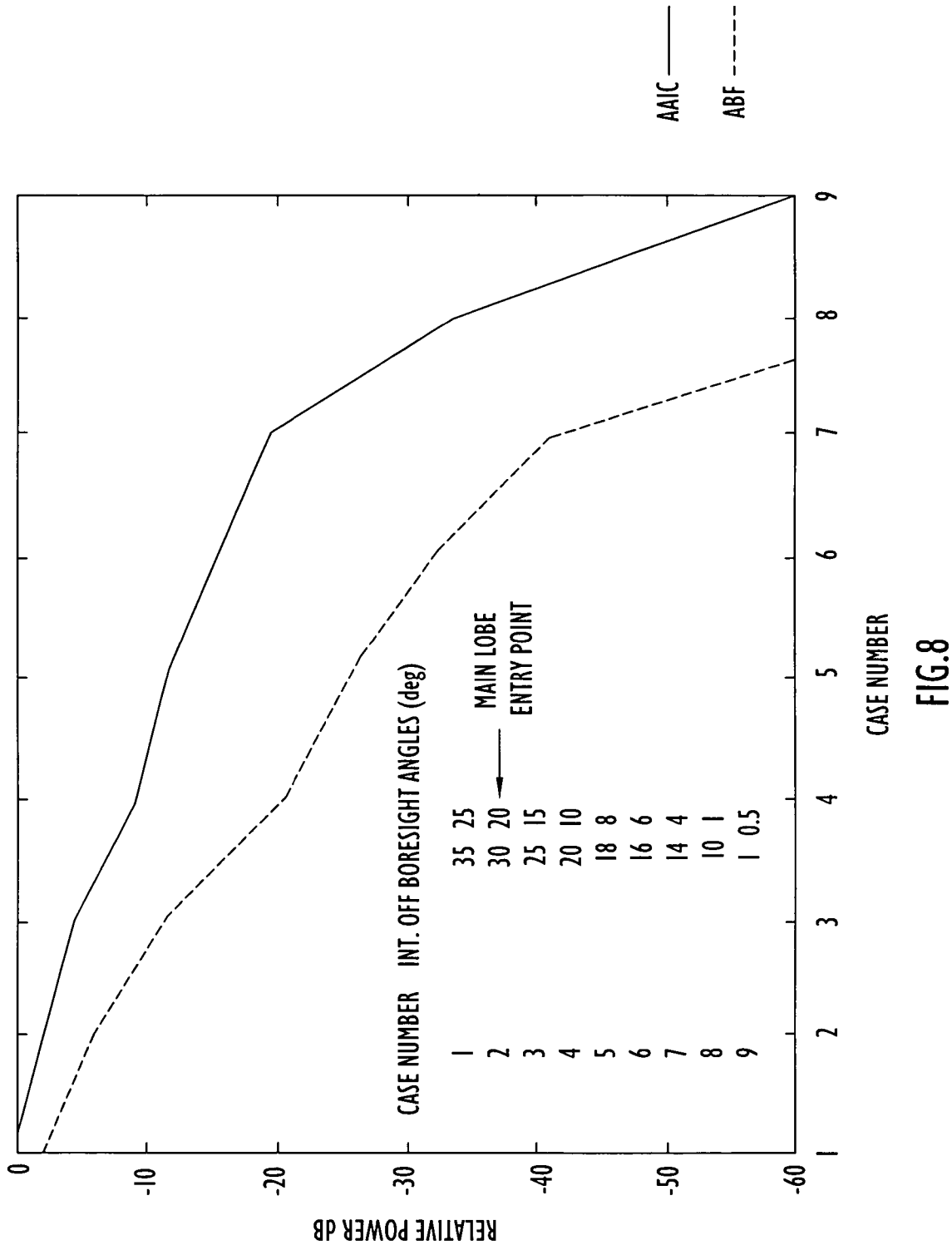
FIG. 8 is a graphical plot of the relative signal power loss resulting from adaptive algebraic interference cancellation and the relative signal power loss resulting from adaptive beamforming/nulling for selected cases of interference signals.

FIGS. 3-5 presented results in terms of beampatterns. In FIGS. 6-8, the relative effects of signal attenuation caused by AAIC and ABF are compared as a function of the angular offset between the signal of interest (located at boresight) and one or more interference signals. In each case, the interference is rejected, and the combined signal power yielded by the four antenna elements is calculated. Since the amount of signal attenuation produced in the two methods is being compared, the signal power for the AAIC used to generate the plots in FIGS. 6-8 is that resulting from the transformation process (i.e., using matrix A) prior to restoring the signal power by dividing by the corresponding T factor. In practice, of course, the signal power loss resulting from AAIC is restored, albeit with a corresponding increase in noise.

FIG. 6 presents the ratio of AAIC to ABF output signal power versus off-boresight angle for a single interferer. It is seen that in the sidelobe region, beyond 20° degrees in this example, the AAIC and ABF signal powers are equal, as expected. Once inside the main lobe, however, the excess signal power for AAIC over that of ABF becomes extremely large. This difference becomes even greater, by many orders of magnitude, for multiple (e.g., in this case three) interferers, as shown in FIG. 7.

Finally, FIG. 8 presents for two interferers the AAIC and ABF signal power levels normalized to the power levels realized when the interference is incident in the sidelobes and the attenuation in signal power is minimal. Consistent with the results in FIG. 7, the excess signal attenuation experienced by ABF over AAIC becomes significant with main-beam interference, and becomes progressively larger as the interference approaches boresight.

It will be appreciated that the embodiments described above and illustrated in the drawings represent only a few of the many ways of implementing and applying the AAIC methods and apparatus described. The present invention is not limited to the specific applications disclosed herein, but may be used in any number of ways. For example, the limitations of conventional adaptive beamforming techniques with respect to the inability to remove interference signals in the main beam without distorting the signal of interest are easily overcome by the described methods and apparatus based upon improvements achieved in the effective resolving power of array antennas, and the AAIC technique is useful in any system employing array antennas in which interference is a potential problem.

The AAIC techniques described may be implemented in any number of modules. Each module can be implemented in any number of ways and is not limited in implementation to execute process flows precisely as described above. The AAIC processes described above and illustrated in the flow charts and diagrams may be modified in any manner that accomplishes the functions described herein.

It is to be understood that various functions of the AAIC method and apparatus may be distributed in any manner among any quantity (e.g., one or more) of hardware and/or software modules or units, computer or processing systems or circuitry.

AAIC processing module(s) may be integrated within a stand-alone antenna/receiver system or may execute separately and be coupled to any number of devices, workstation computers, server computers or data storage devices via any communications medium (e.g., network, modem, direct connection, etc.). The AAIC scheme can be implemented by any quantity of devices and/or any quantity of personal or other type of computer or processing system. The computer system may include any commercially available operating system, any commercially available and/or custom software (e.g., communication software, etc.) and any types of input devices (e.g., radio receiver, etc.).

It is to be understood that the software of the AAIC system may be implemented in any desired computer language, and could be developed by one of ordinary skill in the computer and/or programming arts based on the functional description contained herein and the flow charts illustrated in the drawings. Moreover, the AAIC software may be available or distributed via any suitable medium (e.g., stored on devices such as CD-ROM and diskette, downloaded from the Internet or other network (e.g., via packets and/or carrier signals), downloaded from a bulletin board (e.g., via carrier signals), or other conventional distribution mechanisms).

AAIC output can be presented to the user and/or other processing modules in any manner using numeric and/or visual presentation and/or audible and/or electronic data formats. Further, any references herein of software performing various functions generally refer to computer systems or processors performing those functions under software control. The computer system may alternatively be implemented by hardware or other processing circuitry. The various functions of the AAIC process may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or processes described above and illustrated in the flow charts and diagrams may be modified in any manner that accomplishes the functions described herein.

The system of the present invention may be implemented using any of a variety of hardware and software configurations and is not limited to any particular configuration. For example, AAIC processing may be performed with a signal received via any size of array antenna and is not limited to any particular number of receiving antenna elements and can be configured using any appropriate number and arrangement of antenna elements required to meet particular system requirements, such as beamwidth, scan angle, antenna gain, etc.

Virtually all applications that utilize directional antennas, such as phased array antennas, can benefit from utilization of the described AAIC technique. These application include, but are not limited to, communication, navigation, and radar systems, such as future generations of GPS, GPS augmentation systems, wireless telephony, satellite communication systems, the Global Multi-Mission Service Platform (GMSP), systems employing code division multiple access (CDMA) multiplexing and other communication systems.

Having described preferred embodiments of new and improved methods and apparatus for adaptively performing algebraic interference cancellation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of canceling interference from a signal of interest received by a phased array antenna comprising a plurality of antenna elements, the method comprising:
   (a) generating a plurality of antenna element signals that reflect reception of the signal of interest and interference at the plurality of antenna elements, respectively;
   (b) adaptively determining the direction of one or more interference sources received with the signal of interest;
   (c) for each interference source, constructing a directional interference vector corresponding to the direction of the interference source;
   (d) computing a projection operator that transforms each directional interference vector to a zero vector;
   (e) applying the projection operator to the antenna element signals to remove interference from the antenna element signals; and (f) restoring the signal of interest by individually compensating the antenna element signals for distortion to the signal of interest cause by applying the projection operator.

2. The method of claim 1, wherein:
the phased array antenna comprises M antenna elements;
the projection operator is an M×M matrix A of rank M−k, where k is the number of interference sources identified in (b) and k<M; and
the matrix A is computed to satisfy the expression $Ai_n=0$ for n=1 to k, where $i_n$ are the directional interference vectors.

3. The method of claim 1, wherein (b) includes determining weights that correspond to directions of interference sources.

4. The method of claim 3, wherein the weights are determined without performing a beamforming operation with the weights.

5. An apparatus for canceling interference from a signal of interest, comprising:
a phased array antenna comprising a plurality of antenna elements that respectively generate a plurality of antenna element signals that reflect reception of the signal of interest and interference at the antenna elements; and
a processor configured to: adaptively determine the direction of one or more interference sources received with the signal of interest; for each interference source, construct a directional interference vector corresponding to the direction of the interference source, compute a projection operator that transforms each directional interference vector to a zero vector; apply the projection operator to the antenna element signals to remove interference from the antenna element signals; and restore the signal of interest by individually compensating the antenna element signals for distortion to the signal of interest cause by applying the projection operator.

6. The apparatus of the 5, wherein:
the phased array antenna comprises M antenna elements; and
the processor computes the projection operator as an M×M matrix A of rank M−k, where k is the number of interference sources identified in (b) and k<M, wherein the matrix A is computed to satisfy the expression $Ai_n=0$ for n=1 to k, where $i_n$ are the directional interference vectors.

7. The apparatus of claim 5, wherein the processor adaptively determines weights that correspond to directions of interference sources.

8. The apparatus of claim 7, wherein the processor determines the weights without performing a beamforming operation with the weights.

9. An apparatus for canceling interference from a signal of interest, comprising:
a phased array antenna comprising a plurality of antenna elements that respectively generate a plurality of antenna element signals that reflect reception of the signal of interest and interference at the antenna elements; and
means for adaptively determining the direction of one or more interference sources received with the signal of interest;
means for constructing a directional interference vector corresponding to the direction of each interference source;
means for computing a projection operator that transforms each directional interference vector to a zero vector;
means for applying the projection operator to the antenna element signals to remove interference from the antenna element signals; and
means for restoring the signal of interest by individually compensating the antenna element signals for distortion to the signal of interest cause by applying the projection operator.

10. The apparatus of claim 9, wherein:
the phased array antenna comprises M antenna elements; and
the means for computing the projection operator computes the projection operator as an M×M matrix A of rank M−k, where k is the number of interference sources identified in (b) and k<M, wherein the matrix A is computed to satisfy the expression $Ai_n=0$ for n=1 to k, where $i_n$ are the directional interference vectors.

11. The apparatus of claim 9, wherein the means for adaptively determining the direction of interference sources adaptively determines weights that correspond to directions of interference sources.

12. The apparatus of claim 11, wherein the means for adaptively determining the direction of interference sources determines the weights without performing a beamforming operation with the weights.

* * * * *